United States Patent
Pandey et al.

(10) Patent No.: US 9,135,385 B2
(45) Date of Patent: Sep. 15, 2015

(54) DATA ERROR SUSCEPTIBLE BIT IDENTIFICATION

(71) Applicant: NXP B.V., Eindhoven (NL)

(72) Inventors: Sujan Pandey, Eindhoven (NL); Abhijit Kumar Deb, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 36 days.

(21) Appl. No.: 14/089,143

(22) Filed: Nov. 25, 2013

(65) Prior Publication Data

US 2015/0074631 A1 Mar. 12, 2015

Related U.S. Application Data

(60) Provisional application No. 61/876,842, filed on Sep. 12, 2013.

(51) Int. Cl.
*G06F 17/50* (2006.01)

(52) U.S. Cl.
CPC .................................. *G06F 17/5045* (2013.01)

(58) Field of Classification Search
CPC ....... G06F 17/30; G06F 17/50; H04L 1/0015; H04L 12/2856; H04L 47/10; H04L 43/16
USPC ........................... 716/136; 370/335, 342, 465; 375/E1.003, E1.004, E1.006, E1.009, 375/E1.012, E1.013, E1.016, E1.018, 375/E1.032
See application file for complete search history.

(56) References Cited

U.S. PATENT DOCUMENTS

| | | | |
|---|---|---|---|
| 2001/0046266 A1* | 11/2001 | Rakib et al. | 375/259 |
| 2002/0015423 A1* | 2/2002 | Rakib et al. | 370/485 |
| 2009/0175199 A1* | 7/2009 | Trojer | 370/254 |
| 2011/0158202 A1* | 6/2011 | Ozukturk et al. | 370/335 |

OTHER PUBLICATIONS

D. Ernst, et al. "Razor: Circuit-Level Correction of Timing Errors for Low-Power Operation", IEEE Nov./Dec., pp. 1-11, (2004).

* cited by examiner

*Primary Examiner* — Mohammed Alam

(57) ABSTRACT

As consistent with one or more embodiments, electronic circuitry is characterized to provide an indication of susceptibility of the circuitry to error. As consistent with one or more embodiments, bits corresponding to a circuit component of a circuit design are evaluated using a software program that characterizes a hardware description language representing the circuit components and their interconnectivity. A noise power value is calculated for each bit, and bits are identified as being susceptible to data error based upon the noise power value and a signal-to-noise (SNR) ratio reference value. A characterization of the circuit components (e.g., a quality factor) is provided based upon a number of bits susceptible to data errors.

20 Claims, 3 Drawing Sheets

DATA ERROR SUSCEPTIBLE BIT IDENTIFICATION

This patent document claims benefit under 35 U.S.C. §119 to U.S. Provisional Patent Application Ser. No. 61/876,842, entitled "Fault Tolerant Adaptive Filtering Technique" and filed on Sep. 12, 2013; this patent document is fully incorporated herein by reference.

Aspects of various embodiments of the present invention are directed to data communication systems.

Integrated circuits are susceptible to erroneous operation, which may result from one or more of a variety of contributing factors. For example, transient errors may be due to a number of factors related to hardware such as Vdd scaling, crosstalk, soft errors and electromagnetic interference. Further, when the number of transistors per unit area is increased, the layout dimensions shrink, and the electrical charge that represents stored data in memory cells and in logic gates also decreases. These aspects can contribute to signal integrity degradation. Some applications benefit from particularly robust systems, such as those involving safety applications in automotive, aeronautics, and industrial automation.

Using an automotive application as an example, automobiles may use hundreds of electronic control units (ECUs) that may be deployed in networks in which each ECU communicates with other ECUs. These networks can include local interconnect networks (LIN), controller area networks (CAN), and FlexRay. As the number of ECUs grows for new automotive applications, data is transferred from one node to another node with ever increasing data rates. Errors such as transient errors can present challenges for such communication.

These and other matters have presented challenges related to designing data communication systems to minimize transient errors, for a variety of applications.

Various example embodiments are directed to methods and apparatuses for identifying nodes and bits within a data communication system that are susceptible to transient errors and circuits and their implementation.

According to an example embodiment of the present disclosure, a software program is utilized to characterize electronic circuitry in the design phase of the circuitry. The characterization of the circuitry includes determining whether the circuitry is susceptible to data communication errors (e.g., transient errors). In one embodiment, each bit in the circuit is individually tested to determine its susceptibility to data errors. A noise power value is calculated for each bit, and bits are identified as being susceptible to data error based upon the noise power value and a provided signal-to-noise ratio reference value. For each bit identified as being susceptible to data errors, a value associated with a total number of bits susceptible to such data errors in the circuitry is incremented.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
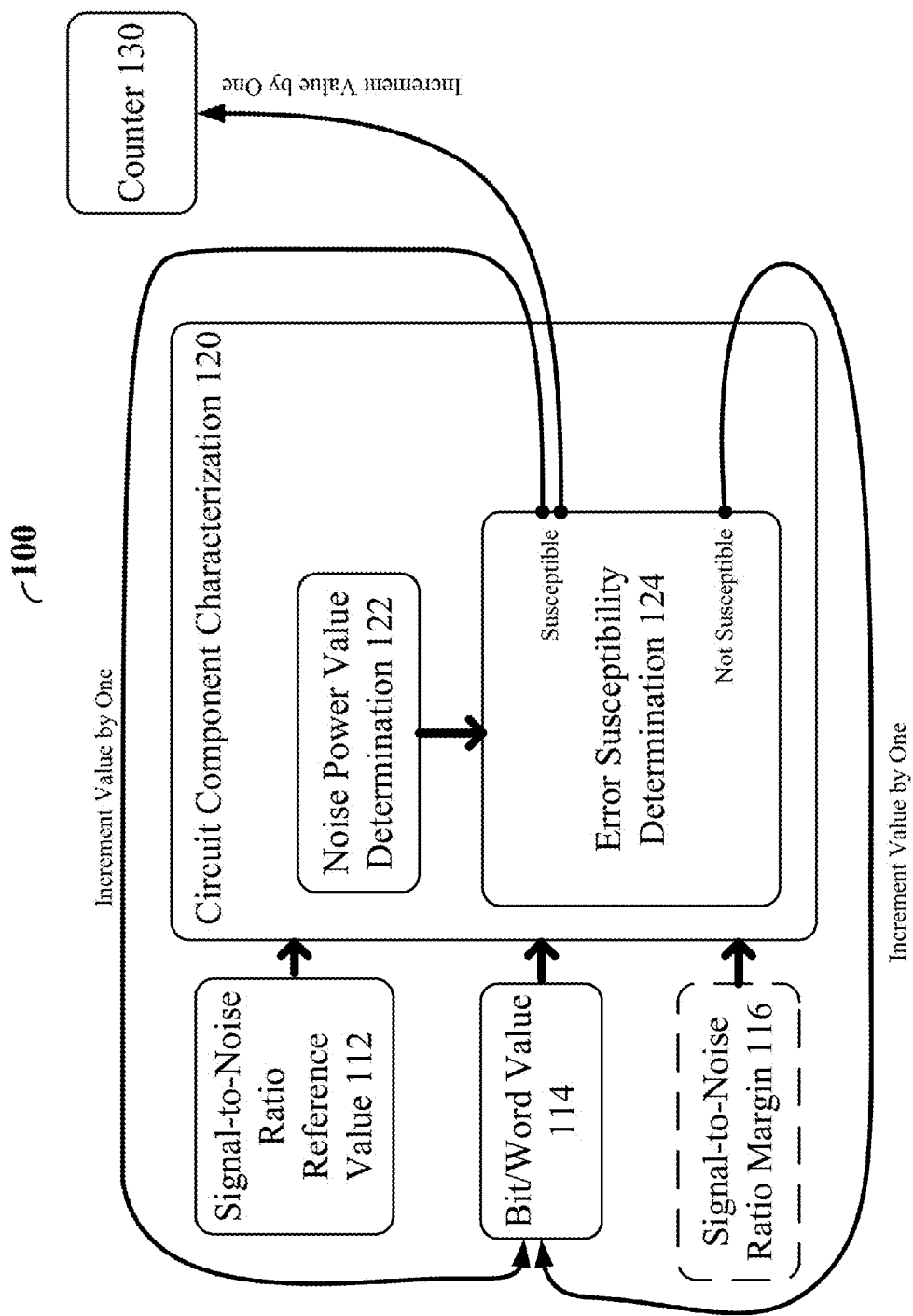
FIG. 1 shows a system and approach for characterizing circuit components, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present invention are believed to be applicable to a variety of different types of devices, systems and arrangements, including those involving data communication and circuits susceptible to errors. Such embodiments may be implemented to address challenges such as those described above, and in the underlying provisional application and the references noted therein. While the present invention is not necessarily so limited, various aspects of the invention may be appreciated through a discussion of examples using such a context.

Various embodiments are directed to identifying bits in a circuit that are susceptible to errors, such as data communication errors. Certain aspects are directed to improving a circuit design's resiliency to such data errors through design optimization techniques, which can be implemented based upon the identified bits. Such approaches can facilitate the use of less reliable components, incorporation of smaller design margins, and/or decreasing or maintaining the driving strength of devices in a circuit, using error identification and design optimization techniques as discussed herein.

In many implementations, a vulnerable bit or bits in a word are identified with specificity, providing a more specific indication of issues relative to identifying the entire word as being susceptible to error. Using such an approach, design optimization can be implemented on the bit level, facilitating the use of less conservative designs (e.g., relative to error identification at a word level). Further, power and area can be conserved using such a bit-specific approach.

According to one embodiment of the present disclosure, a circuit design is tested for susceptibility to transient errors as follows. For each of a plurality of bits representing components of the circuit design, a noise power is computed and compared to a signal-to-noise-ratio reference value (SNR), such as a SNR based upon an acceptable error rate. In some embodiments, the comparison is made to the SNR plus a margin value, as may be related to an acceptable error rate. The bits may be selected using one or more of a variety of approaches. In some embodiments, a first bit is selected as a first bit of a word corresponding to the circuit. In other embodiments, bits are selected at random, based on an instruction, or based on an order pertaining to a least or most significant bit.

The comparison is used to identify bits as being susceptible to data errors. In some implementations, a counter associated with the number of bits susceptible to data error is incremented when such bits are identified, and additional bits are similarly tested. This identification of bits can be used, as discussed above, to modify or otherwise enhance circuit designs.

In some embodiments, the bits determined to be susceptible to data error are then hardened for such data error via selective radiation hardening or other related design optimization techniques for minimizing data error in a data communication circuit. Selective radiation hardening of a circuit containing data errors allows for less significant circuit area increases to manage the data errors, and considerably lower power increase.

In a more particular embodiment, a software program is utilized to characterize electronic circuitry in the design phase of the circuitry. Such characterization is then used to re-design aspects of the circuitry susceptible to data errors. The software program tests some or all bits corresponding to a design by calculating a noise power value for the bits, and identifying bits as being susceptible to data error based upon the noise power value for the bit being greater than a signal-to-noise ratio reference (SNR) value (e.g., a predetermined value, or such a value summed with a margin). Such a SNR value may, for example be set to correspond to a maximum acceptable level of error with which a system is capable of functioning properly.

A variety of design optimization techniques are utilized in connection with information indicative of the bits identified as being susceptible to data errors. In one embodiment, selective radiation hardening is used with circuit components corresponding to bits identified as susceptible to errors, such as transient errors. In another embodiment, the circuit is redesigned using resilient design techniques in areas having circuit components corresponding to bits identified as being susceptible to errors.

Figure 3:
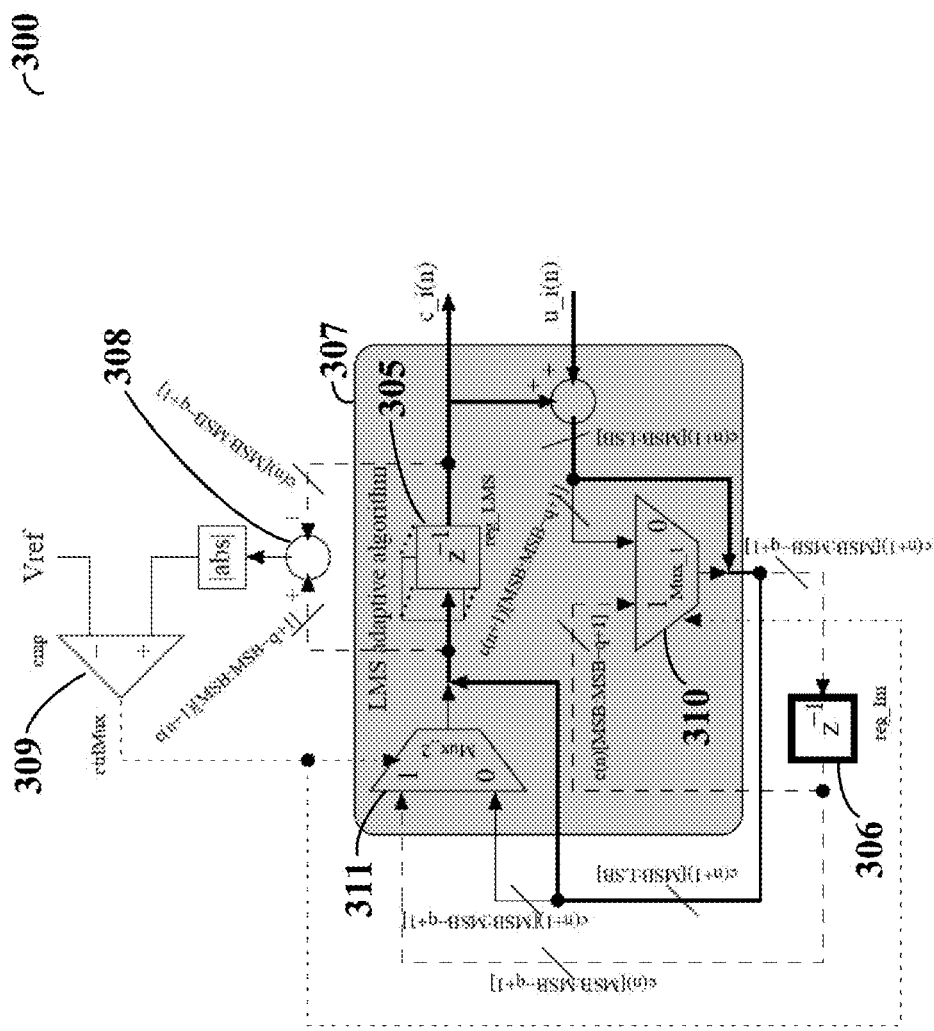
FIG. 3 is an implementation of a transient error resilient design technique, consistent with various aspects of the present disclosure.

This application claims priority and benefit under 37 CFR §1.78 to the prior-filed provisional application No. 61/876,842, filed on Sep. 12, 2013, the contents of which are incorporated by reference herein. Various embodiments are implemented to address issues described in this underlying provisional application, or may be implemented in connection with one or more approaches described in the provisional application. For instance, errors relating to faults with Vdd scaling, crosstalk, soft errors and electromagnetic interference as described in Section I may be addressed with the approaches described herein. Further embodiments may be implemented to address errors in an impulse response filter as discussed in Section II and/or a serial communication link as discussed in Section IV in the provisional application, such as by detecting fault locations as shown in FIG. 1 or with a circuit as shown in FIG. 3. Such approaches may be implemented to mitigate transient errors, such as those modelled in Section III.

Various aspects of the present disclosure are directed toward a method for characterizing circuit components, using a software program that characterizes a hardware description language that represents the circuit components and their interconnectivity. A signal-to-noise ratio (SNR) reference value is provided, is based upon a predefined bit error rate. Each circuit component is associated with a bit in a word, and a noise power value is determined for each bit. Bits are identified as being susceptible to data errors, based upon the noise power value and the SNR reference value. In some implementations, a value indicating a total number of bits susceptible to data errors is incremented for each bit so identified.

In some embodiments, bits are identified as being susceptible to data errors by comparing a noise power value to a sum of an SNR ratio and a predefined SNR margin value. In some detailed embodiments, an output signal indicative of a quality factor of the circuit components and their interconnectivity is generated, based upon the bits identified as being susceptible to data errors. In certain implementations, information is collected for each bit determined to be susceptible to data errors, to facilitate the detection of the specific bit (and related circuit component) generating an error.

Various embodiments directed towards methods in which an SNR reference value is provided along with an SNR margin value. The SNR ratio value characterizes a predefined bit error rate, and is used with the margin (e.g., by summing) as a comparison to a detected noise value for one of more bits. These bits are correspondingly determined as being indicative of errors, based upon the comparison. In some embodiments, an SNR margin value and an SNR reference value can be computed for each of a plurality of the bits.

The number of bits and related circuit components that are evaluated can be varied to suit particular embodiments and applications, such as to achieve a desired level of robustness and/or focus upon certain circuits. In some embodiments, the steps of determining, identifying and incrementing are carried out for every bit in a word. In other embodiments, these steps are carried out for a plurality of words, with quality values being determined for each word collectively based upon the bits in that word. In still other embodiments, a single value is used to represent a number of data errors for all bits and/or all words characterized. In yet other embodiments, the steps of determining, identifying and incrementing are carried out for a subset of bits in the word.

In certain embodiments, a source of error is determined for one or more bits identified as being susceptible to data error. For instance, an error can emanate from the bit or can propagate from another circuit component that provides an input to the circuit component pertaining to the bit identified as being susceptible to error. As such, a determination is made as to whether the error was initiated in the bit. For instance, values provided at an input and output of the bit can be and used to determine whether the bit received an erroneous input and/or generated an erroneous output. In some implementations, in response to determining that an input is in error, a corrected input is provided to the circuit component corresponding to the bit. The corrected input is then used in determining a noise power value for the bit of the circuit component. In such an embodiment, the characterization of circuit components may involve providing inputs for simulating operation of the circuit components.

Various embodiments of the present disclosure further include the step of optimizing a circuit design of the circuit components and their interconnectivity based upon the total number of bits susceptible to data errors. In some embodiments, the circuit design of the circuit components can be programmatically amended to change instructions representing at least one circuit component producing at least one of the bits identified as being susceptible to data errors.

Turning now to the figures, FIG. 1 shows a system and approach 100 for characterizing circuit components, consistent with aspects of the present disclosure. In FIG. 1, a number of inputs are utilized by the circuit component characterization block 120. The first input is a signal-to-noise ratio reference value 112 (SNR). The SNR value provided at block 112 may be related, for example, to a system requirement or limitations related to the ability of hardware most susceptible to errors, to cope with those errors. Another input of block 120 is a bit/word value 114 which determines which of the bits in the circuit is to be evaluated. The circuit component characterization block 120 determines the noise power value at module 122 for the bit specified via the bit/word value input at 114. The noise power value determination module 122 then outputs the determined noise power for the selected bit to an error susceptibility determination module 124, which determines whether or not the noise power is indicative of whether the bit being characterized is susceptible to data errors.

If a particular bit is indicated as susceptible to error, the error susceptibility determination module 124 outputs a signal to the counter 130 to increment the counter by one. In some implementations, the error susceptibility determination module 124 also outputs a value indicative of a location of the bit (representing a circuit component), facilitating the specific identification of the bit causing the error. Whether or not the bit is indicated as susceptible to error, a signal is also output to the bit/word value module 114 to increment the tested bit by one. The counter 130 maintains a count of all the bits determined to be susceptible to transient error. The information provided via the counter 130 and/or otherwise characterizing the bits facilitates various approaches to evaluating designs and/or correcting errors, such as via redesign and/or radiation hardening approaches that allow the design to meet requirements related to data error and acceptable SNR.

In some implementations, such as those in which an application may benefit from an added safety factor (such as automotive, aeronautics and industrial automation applications), an added signal-to-noise ratio margin 116 is used in conjunction with the SNR value 112. Such a margin may compensate for many unexpected and expected occurrences during the life of the circuit. Examples of unexpected occurrences may include early life hardware failures and mechanical damage to the circuit resulting in increased signal resistance and accordingly, data errors. Examples of expected occurrences may include manufacturing-related electrical component characteristic deviations and electrical component characteristic deviations over the life of the circuit. In such instances, the error susceptibility determination module 124 determines the susceptibility of bits to error by comparing the noise power value to the sum of both the SNR value and the optional SNR ratio margin.

Noise power estimation may be carried out in one or more of a variety of manners, including those as described in the underlying provisional application (e.g., in Section III). In some embodiments, the noise power ($\sigma_\epsilon^2(n)$) for an error at time n is estimated as follows, $$\sigma_\epsilon^2(n) = \begin{cases} \sigma_\delta^2 \cdot \sigma_{x_i}^2, & @c_i(n) \\ \sigma_\delta^2 \cdot \sigma_{c_i}^2, & @x_i(n) \\ \sigma_\delta^2, & @p_i(n), y(n) \end{cases} \quad \text{Equation 1}$$

where the terms $\sigma_{x_i}^2$ and $\sigma_{c_i}^2$ are the variances of input data $x(n)$ and coefficient $c_i$ for tap i, respectively. For instance, at time n if there is a transient error at $c_i(n)$ (the filter coefficient), $x_i(n)$ (input), $p_i(n)$, or $y(n)$ (filter output), filter output is erroneous at time n since their primary error propagation path is combinational. For time t>n+1, assuming that there is no more error after t>n, the secondary error propagation path of the above error locations is sequential, thus the filter output noise power is estimated as $$\sigma_\epsilon^2(n+m-1) = \sum_{i=1}^{N_{taps}} \sigma_{\epsilon_{c_i}}^2(n+m-1) \cdot \sigma_{x_i}^2 \quad \text{Equation 2}$$

where the variable {m; m=2 ... ∞} is a discrete time index. The filter output noise power is calculated by summing the product of filter coefficient noise power and variance of input data for each tap {i; i=1 ... $N_{taps}$}.

According to one embodiment, an error identification technique is carried out as follows, with a representation in Algorithm 1 (below), to identify bit position as well as the number of bits that are vulnerable to transient error in a data communication circuit design. The resulting algorithm output can be used to optimize a design so that it is acceptably resilient to errors. The algorithm takes three inputs, number of bits (N) of a word, signal to noise ratio (SNR) that is required to receive bits at a receiver with a certain bit error rate, and a signal to noise ratio margin ($\Delta M$):

Algorithm 1
NO.-OF-VULNERABLE-BITS(N,SNR,$\Delta M$)

```
1  q_p,q ← 0;
2  for i = LSB : MSB,
3     if (σ_ε^2(i) > SNR + ΔM){
4        q++;
5        q_p(i) = i; }
6     else
7        q = q;
8     endif;
9  endfor;
10 return q;
```

In the algorithm at line 1, the variables vulnerable bit position $q_p$ and the number of bits q are initialized to zero. At line 2, the for loop runs from the least significant bit (LSB) to the most significant bit (MSB) of a word, and the noise power $\sigma_\epsilon^2(i)$ is computed at line 3, for an error at bit position i, and the noise power is compared with SNR+$\Delta M$. If the computed noise power is greater than the SNR plus the SNR margin, then the variable q is incremented and the bit position is stored in variable $q_p$ at line 4 and 5 respectively. If the computed noise power is not greater than the SNR plus the SNR margin, the variables are kept unchanged at line 7. The algorithm can be re-run for each data bit in the word until all bits have been tested. After the bits have been tested, at line 10, the number of vulnerable bits is returned, which can be used to optimize the design to be more resilient to the identified transient errors.

In connection with these embodiments, it has been discovered that the use of the algorithm in conjunction with correction techniques, such as circuit redesign and/or selective bit hardening (as discussed in more detail below), can achieve minimal area and power increments in an optimized design that meets or exceeds the signal to noise ratio (SNR) (e.g., an SNR that is required to receive bits at a receiver below a maximum bit error rate). Further, by identifying the location of specific bits in this regard, optimization techniques can be tailored to specific bits, rather than entire words. For example, the incremental area increase in the optimized design (using selective hardening) can be limited to about 11.44% and a power increase in the circuit can be limited to about 7.6%.

Figure 2:
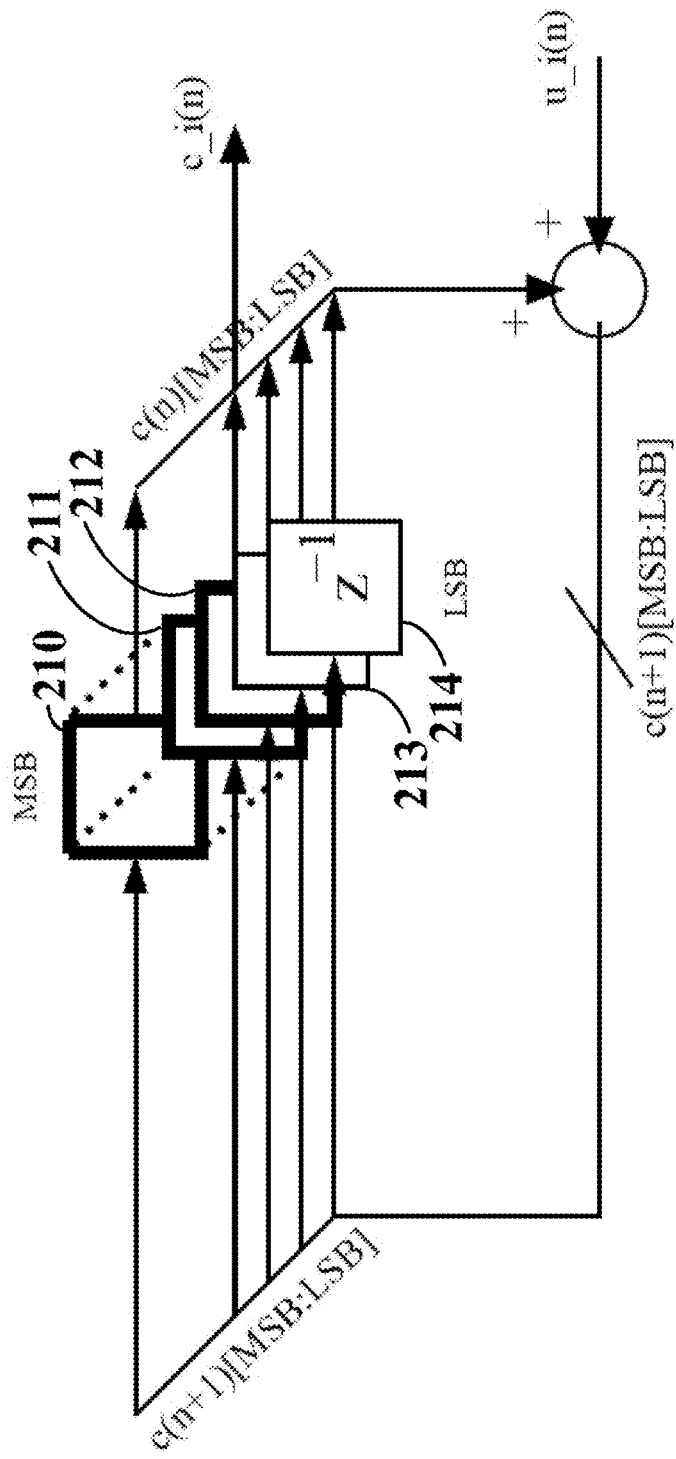
FIG. 2 is an implementation of a selective radiation hardening technique, consistent with various aspects of the present disclosure.

A variety of techniques may be implemented to improve or otherwise render designs less susceptible to error. FIG. 2 shows an implementation of a selective radiation hardening technique, consistent with various aspects of the present disclosure. Three bits 210-212, including a MSB, are shown as being hardened by way of example. Bits 213-214 including a LSB are left unhardened (e.g., as not determined as being susceptible to transient error). After hardening, the resulting circuit design is rendered capable of meeting or exceeding the signal to noise ratio (SNR), such as an SNR required to receive bits at a receiver with a required bit error rate. An error at $u_i(n)$ represents a read error at location $u_i$ at time n and tap i. The data includes an error $u_i(n)$ communicated through, for example, bit 212 which produces a transient error output $c_i(n)$, in response to the error $u_i(n)$. The $c_i(n)$ of the bit at 212 (to be hardened) is less than the $c_i(n)$ for bits at 213-214.

Where only a few bits require protection from soft errors, instead of protecting all bits (which may be the case for a conservative approach) selective radiation hardening can be implemented to protect bits susceptible to soft errors. In implementations in which the soft error rate (SER) of a combinational circuit is less than the memory elements, a radiation hardening technique is limited to the memory elements. As discussed in more detail above, the number of registers and their positions can be obtained from Algorithm 1. For example, where each bit represents a circuit component, once the bit is identified as being susceptible to data errors, information indicative of which circuit component the bit pertains to is provided. Such information can be used to re-design or harden the circuit to be more resilient to transient errors.

FIG. 3 depicts a circuit-based resilient design technique 300 that corrects for transient errors, in accordance with another example embodiment. Errors such as transient errors can relate to soft errors, crosstalk, and electromagnetic interference, and can originate from combinational or sequential circuits. Accordingly, a transient fault in a system can potentially be manifested as a transient error through latching phenomena of circuit components, such as memory elements. Where the transient error is manifested in the latching phenomena of a memory element, the circuit based resilient design technique is used to improve the robustness of the data communicated in the circuit. In such a case, to reduce transient error, additional logic gates are used around a block to be protected, as shown in FIG. 3.

When a transient error originates from logic before a least-mean-square (LMS) register 305, it is detected as an error before the LMS register. When a transient error originates from the LMS register 305 (reg_LMS), it is detected at the output of the LMS register. The difference between the present value of coefficient c(n) and its estimated next value c(n+1) is monitored and used in this regard to determine whether an error is occurring at the particular bit or has propagated from elsewhere in the design. For instance, if the difference is greater than a predefined maximum allowable difference (Vref), then the previous coefficient value is used (e.g., c(n)[MSB:MSB-q+1] from the image registers 306 (reg_Im)) (as shown in FIG. 3). As discussed in more detail above, when the image registers 306 are vulnerable to soft errors, their q-bits can be protected through radiation hardening techniques.

In addition to the LMS algorithm block 307 in FIG. 3, the circuit-based approach in FIG. 3 employs additional logic gates including a q-bits subtractor 308, one q-bits comparator 309, two N-bits multiplexers 310 and 311, and registers 305 and 306. In some embodiments, the operation of selective transient error resilient design technique as shown in FIG. 3 is implemented in accordance with Pseudocode 1 (below), which involves three concurrent processes signal ctrlMux, Mux_2, and Mux_1:

```
                    Psuedocode 1
                   ARCHITECTURE( )

1   signal_ctrlMux : Process (q,c)
2   begin
3     if |c(n + 1)[MSB : MSB − q + 1]
4            − c(n)[MSB : MSB − q + 1]| > Vref
5       ctrlMux ← true;
6     else
7       ctrlMux ← false;
8     end
9   end
10  Mux_2 : Process (q,ctrlMux,c)
11  begin
12    if (ctrlMux is true)
13       outMux_2 ← c(n)[MSB : MSB − q + 1]
```

```
                    Psuedocode 1
                   ARCHITECTURE( )

14                    &c(n + 1)[MSB − q : LSB];
15    else
16       outMux_2 ← c(n + 1)[MSB : LSB];
17    end
18  end
19  Mux_1 : Process (q,ctrlMux,c)
20  begin
21    if (ctrlMux is true)
22       outMux_1 ← c(n)[MSB : MSB − q + 1]
23                    &c(n + 1)[MSB − q : LSB]
24    else
25       outMux_1 ← c(n + 1)[MSB : LSB];
26    end
27  end
```

The process signal_ctrlMux detects an error at the input and the output of an LMS register 305, respectively, and processes Mux_2 and Mux_1 to correct the erroneous coefficient by selecting input of Mux_2 and Mux_1, respectively. At line 1, the process signal_ctrlMux generates the control signal (ctrlMux) to select the inputs of Mux_2. If the input of the LMS register 305 is erroneous and the term |c(n+1)−c(n)|>Vref then the control signal ctrlMux is set to true, and is otherwise set to false (see Pseudocode 1; lines 3-7). At line 10, process Mux_2 monitors the control signal ctrlMux. If a transient error is detected at the input of the LMS register 305 then the next value of the LMS coefficient c(n+1) will be the concatenation of q-bits coefficient that is stored in the image registers and N-q bits from the LMS adder as shown at line 13. If an error is not detected, then the next value of the coefficient is the output of the LMS adder as at line 16. If there is an error, at line 19, the process Mux_1 corrects the erroneous coefficient through selecting Mux_1 input that is the concatenation of q-bits of previous coefficient value (stored in the image registers) and N-q bits from the output of the LMS adder as at line 22. If an error is not detected, then the process selects Mux_1 input that is N-bit coefficient from the LMS adder (see, Pseudocode 1, line 25).

In connection with various embodiments, it has been discovered that the use of the LMS algorithm in conjunction with a resilient design technique, as disclosed above, can achieve minimal area and power increases in the optimized design to meet or exceed a signal to noise ratio (SNR) desired for receiving bits at a receiver with a particular bit error rate. For example, in some embodiments, an incremental area increase in an optimized design is limited to about 27.1% and the power increase to about 29.3%.

Various modules or other circuits may be implemented to carry out one or more of the operations and activities described herein and/or shown in the figures. In these contexts, a "module" is a circuit that carries out one or more of these or related operations/activities (e.g., providing a signal-to-noise ratio reference value, determining a noise power value for each bit, or incriminating a value indicative of a total number of bits susceptible to data errors). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible form of memory (circuit). As an example, first and second modules include a combination of a CPU hardware-based circuit and a set of instructions in the form of firmware, where the first module includes a first CPU hardware circuit with one set of instructions, and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities. Embodiments of the present disclosure can also be stored as instructions in a non-transitory computer-readable medium and executed by a computer processor circuit.

Based upon the above discussion and illustrations, those skilled in the art will readily recognize that various modifications and changes may be made to the present invention without strictly following the exemplary embodiments and applications illustrated and described herein. For example, variables—signal to noise ratio, and signal to noise ratio margin may be determined in a variety of manners including estimations, pre-algorithms taking into account aspects of the circuit design, or based on elements of the circuit that set a minimum requirement for the data communicated. Moreover, such variables may be applied to all bits in a data communication circuit or to a single bit, wherein the susceptibility of other bits to transient error is calculated relying on other signal to noise ratio, and signal to noise ratio margin values. Such modifications do not depart from the true spirit and scope of the present invention, including that set forth in the following claims.

What is claimed is:

1. A computer implemented method comprising:
   characterizing a hardware description language that represents circuit components and their interconnectivity; and
   by a computer, characterizing the circuit components by:
      setting a signal-to-noise ratio (SNR) reference value that is based upon a predefined bit error rate; and
      for bits in a word, in which each bit corresponds to one of the circuit components,
         determining a noise power value for the bit,
         identifying the bit as being susceptible to data errors based upon the noise power value and the SNR reference value, and
         for each bit identified as being susceptible to data errors, incrementing a value indicative of a total number of bits susceptible to data errors and outputting from the computer, data indicative thereof.

2. The method of claim 1, wherein identifying the bit as being susceptible to data errors based upon the noise power value and the SNR reference value includes comparing the noise power value to a sum of a SNR ratio and a predefined SNR margin value, further including using the incremented value to generate, by or from logic circuitry, an output signal indicative of a quality factor of the circuit components and their interconnectivity.

3. The method of claim 1, wherein providing the SNR reference value includes:
   providing, by or from logic circuitry, a signal-to-noise (SNR) ratio value that characterizes a communication of bits with a predefined bit error rate;
   providing a predefined SNR margin value; and
   summing the SNR ratio value and the SNR margin value, the sum being the SNR reference value.

4. The method of claim 1, wherein the steps of determining, identifying and incrementing are carried out, by or from logic circuitry, for every bit in the word.

5. The method of claim 1, wherein the steps of determining, identifying and incrementing are carried out for a plurality of words, and incrementing the value includes incrementing a separate value for each of the words.

6. The method of claim 1, further including, for each bit identified as being susceptible to data errors, providing information indicative of which circuit component the bit pertains to.

7. The method of claim 1, wherein the steps of determining, identifying and incrementing are carried out for a subset of bits in the word.

8. The method of claim 7, further including, for each bit identified as being susceptible to data errors, providing information indicative of which circuit component the bit pertains to.

9. The method of claim 1, wherein the steps of determining, identifying and incrementing are carried out for a plurality of words, and incrementing the value includes incrementing a single value that characterizes all of the words.

10. The method of claim 9, further including, for each bit identified as being susceptible to data errors, providing information indicative of which circuit component the bit pertains to.

11. The method of claim 1, further including, for each bit identified as being susceptible to data error, determining whether a source of the error is the circuit component pertaining to the bit or a propagated error from another circuit component providing an input to the circuit component pertaining to the bit.

12. The method of claim 11, wherein determining whether a source of the error is the circuit component pertaining to the bit or a propagated error from another circuit component providing an input to the circuit component pertaining to the bit includes determining, for bits identified as susceptible to data errors, whether a bit provided as an input to the circuit has been identified as susceptible to data errors.

13. The method of claim 12,
   wherein characterizing the circuit components includes providing inputs for simulating operation of the circuit components, and
   further including, in response to determining that an input provided to a circuit component is provided via a bit identified as susceptible to data errors, providing a corrected input to the circuit component, wherein determining a noise power value for the bit of the circuit component includes determining the noise power value using the corrected input.

14. The method of claim 1, further comprising optimizing a circuit design of the circuit components and their interconnectivity based upon the total number of bits susceptible to data errors.

15. The method of claim 1, further comprising programmatically amending a circuit design of the circuit components to change instructions representing at least one circuit component producing at least one of the bits identified as being susceptible to data errors.

16. A method comprising:
   providing a SNR reference value that is based upon a predefined bit error rate;
   providing a SNR margin value that characterizes a predefined margin of error; and
   characterizing the error susceptibility of circuit components in a circuit design, via CPU execution of a software program that characterizes a hardware description language representing the circuit components, by
determining a noise power value for each bit in a plurality of words, in which each bit corresponds to one of the circuit components,
identifying bits as being susceptible to errors based upon the noise power value for the bit being greater than a sum of the SNR reference value and the SNR margin value; and
providing an output indicative of a total number of the bits identified as being susceptible to errors, thereby characterizing the susceptibility of the circuit components in the design to error.

17. The method of claim 16, wherein
providing an SNR reference value includes computing an SNR reference value for each of a plurality of the bits, and
providing an SNR margin value includes computing an SNR margin value for each of the plurality of the bits.

18. The method of claim 16, further including, for each bit identified as being susceptible to error, determining whether a source of the error is the circuit component pertaining to the bit or a propagated error from another circuit component providing an input to the circuit component pertaining to the bit, based on other of the bits identified as being susceptible to error and the circuit design.

19. A non-transitory computer-readable medium that stores instructions that characterize a hardware description language representing circuit components and their interconnectivity, and that, when executed by a computer processor circuit, cause the computer processor circuit to:
determine a noise power of bits in a word, in which each bit corresponds to one of the circuit components,
for each bit, identify the bit as being susceptible to data errors based upon the noise power value and a SNR reference value that is based upon a predefined bit error rate, and
for each bit identified as being susceptible to data errors, incrementing a value indicative of a total number of bits susceptible to data errors and outputting from the computer processor circuit an output signal indicative of the total number of bits.

20. The computer-readable medium of claim 19, wherein the instructions, when executed by the computer processor circuit, cause the computer processor circuit to
identify the bit as being susceptible to data errors by comparing the noise power value to a sum of a SNR ratio and a predefined SNR margin value, and
generate the output signal indicative of a quality factor of the circuit components and their interconnectivity.

* * * * *